July 12, 1927.
E. C. MEAD
1,635,378
COMBINED FISHING TACKLE BOX AND LINE WINDER AND DRIER
Filed Oct. 17, 1925
2 Sheets-Sheet 2
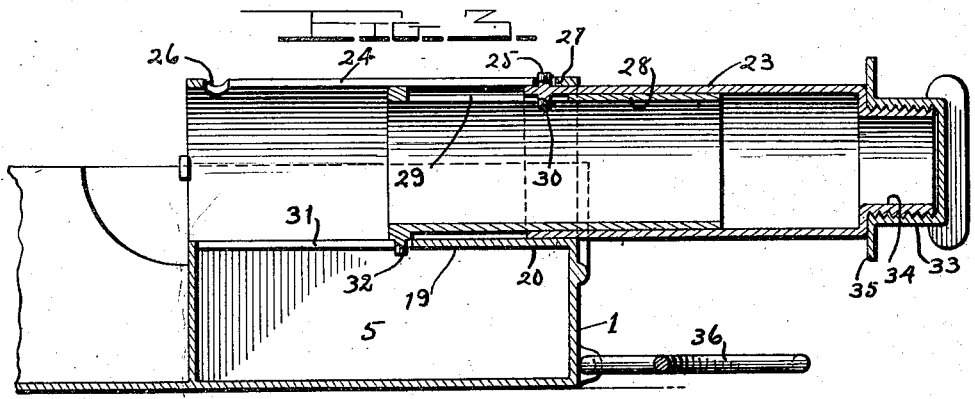
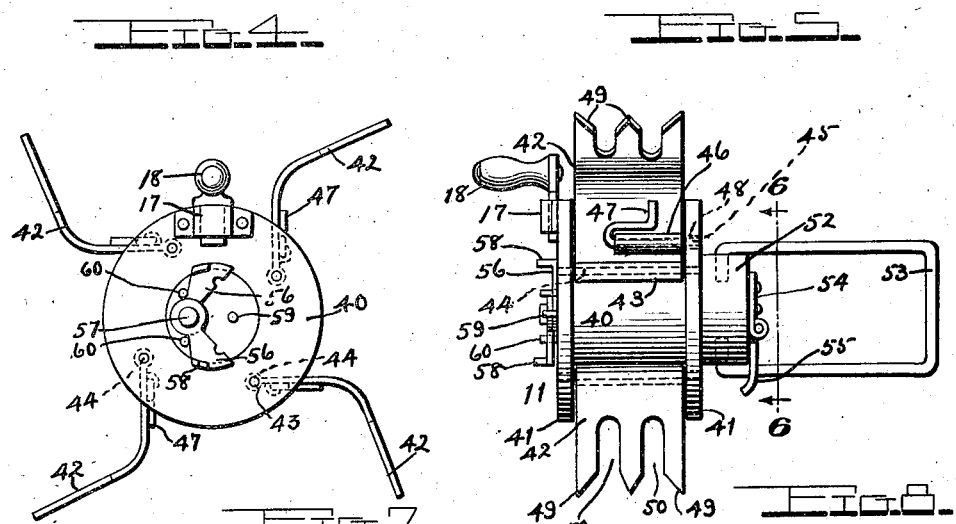
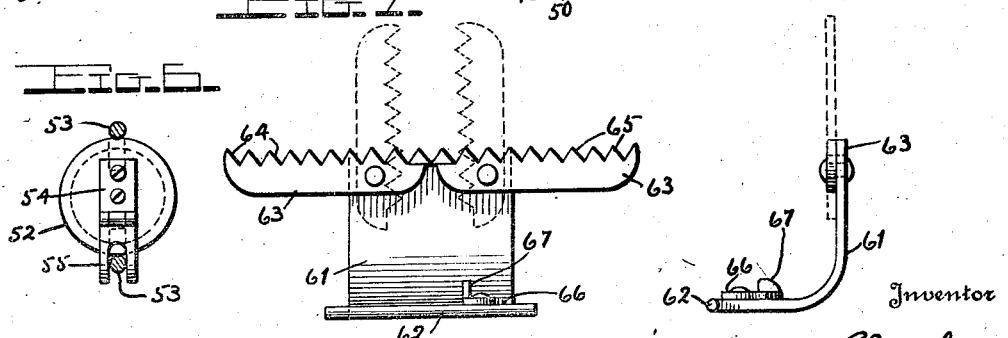
Inventor
Edward C. Mead
By
Louis C. Vanderlip.
Attorney Patented July 12, 1927.

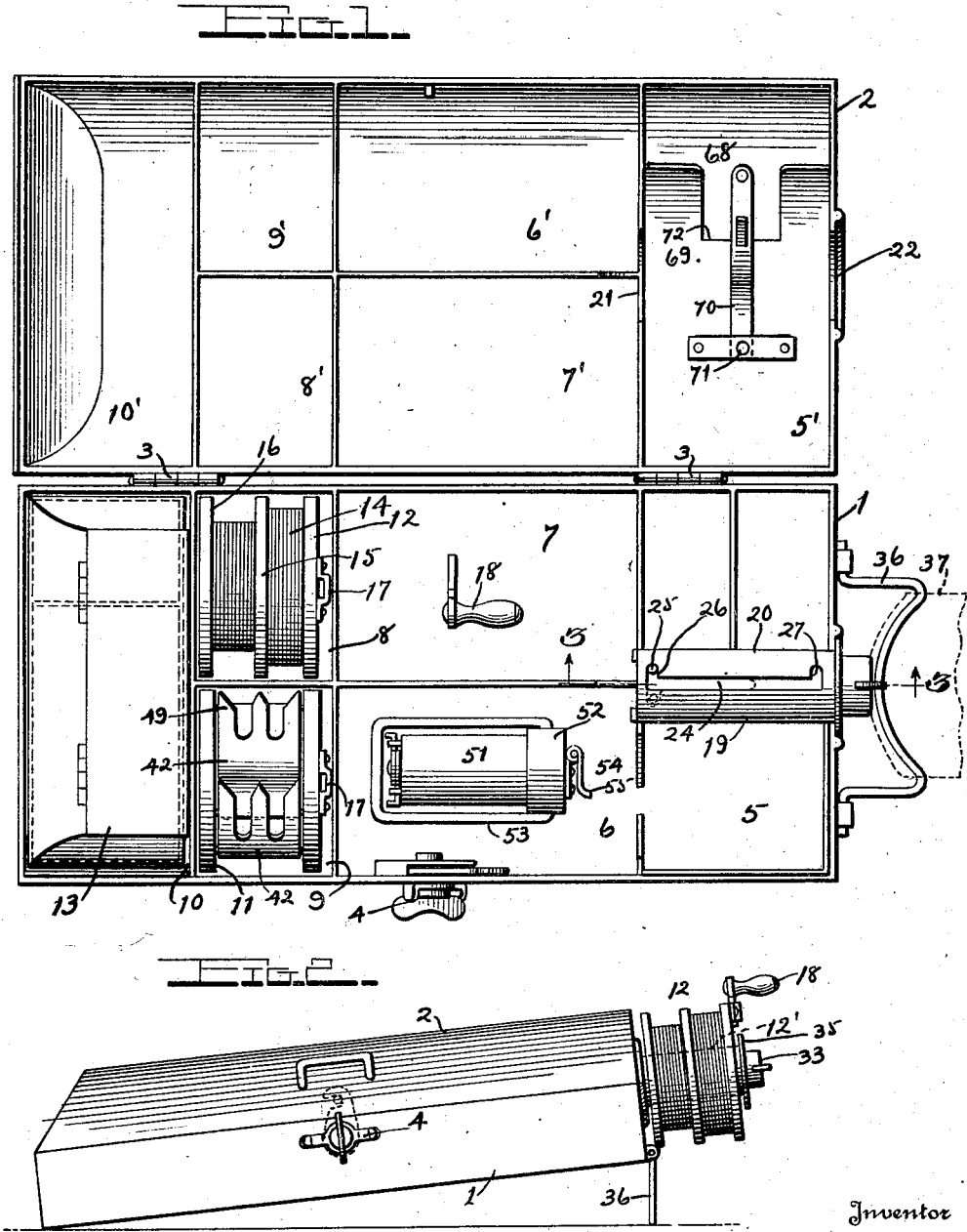

1,635,378

UNITED STATES PATENT OFFICE.

EDWARD C. MEAD, OF ELKHART, INDIANA.

COMBINED FISHING-TACKLE BOX AND LINE WINDER AND DRIER.

Application filed October 17, 1925. Serial No. 63,142.

This invention relates to improvements in boxes for fishing tackle and the like.

It is an object of the invention to provide a box with a plurality of compartments adapted to receive the various parts required for maintaining the fishing line or other parts in proper condition and to retain these various parts separate from each other within the compartments, whereby their use at any time may be facilitated.

It is also an object of the invention to utilize a portion of a kit or box for facilitating certain operations required in order to keep the fishing line in proper condition, as for instance, the rewinding of the line on a reel, or the drying of the line.

Another object of the invention is to provide in combination with a box serving for receiving the various implements required for fishing, as hooks, sinkers, etc., a support on which a line spooling device may be rotatably maintained so as to be accessible for operation on the outside of the box.

The invention also has the object of providing a new device for drying the line after use and to provide a compartment within the box in which this device when not in use may be stored in a handy compact condition, while upon using said drier it occupies a relatively large volume and may be operated after having been assembled on the spool support permanently associated with the box or on other parts stored in a compartment of the box.

The invention also has the object of providing a compartment in which more delicate parts or implements required, such as artificial bait, flies and the like, may be retained separately from other implements necessary for fishing and may, therefore, be maintained in a more accessible and better condition than this has been feasible heretofore.

With these and numerous other objects in view an embodiment of the invention is described in the following specification in which reference is made to the accompanying drawing.

In the drawing:

Fig. 1 is a top plan view of the box opened;

Fig. 2 is a side elevation of the box when used with the re-spooling device for the line;

Fig. 3 is an enlarged fragmentary section on line 3—3 of Fig. 1, showing support for the reeling device in operative condition, while in Fig. 1 it is shown in inoperative condition;

Fig. 4 is a front elevation of the line drier in operative condition, as contrasted with the view in which it is shown in Fig. 1;

Fig. 5 is a side elevation of said line drier;

Fig. 6 is a sectional detail view on line 6—6 of Fig. 5;

Fig. 7 illustrates in front elevation a detail part of a modified embodiment of the line drier.

Fig. 8 is a side view of the same part.

The box preferably made of sheet metal comprises a body 1 and a cover 2 suitably secured to the body by means of hinges 3 and adapted to be retained in closed position by a suitable hook latch, as shown at 4. The body 1 of the box is divided by partition walls into a plurality of compartments, 5, 6, 7, 8, 9 and 10, of which certain compartments are destined to receive certain parts exclusively while other compartments may receive miscellaneous articles in any desired, more or less regular, arrangement. The compartment 9, for instance, is of a size and configuration to receive a line drier 11 when the latter is in folded or inoperative condition, while the compartment 8 may receive a winding spool 12, and the compartment 10 is of a size sufficiently large to receive a suitable box 13 in which bait may be safely kept.

The cover 2 hinged to the body 1 also is provided with partition walls to provide compartments 5', 6', 7', 8', 9' and 10', the arrangement of which corresponds to that of the compartments in the body 1; whereby upon the closure of the cover 2 all of the compartments are closed and suitably separated from each other, and the articles within the box are maintained in condition in which they are ready at any time for immediate use. The compartment 10 may be provided with a slanting cover portion corresponding to the slanting top portion of the bait box 13 so as to facilitate the box being slipped into the pocket of a coat or the like with the attenuated end foremost.

The line reeling or respooling device 12, as shown in Fig. 1, comprises a spool body 14 having a plurality of cylindrical portions of different diameters adapted to receive longer or shorter lines or lines of different strength, and adapted to keep these lines separated. The two portions of this spool body are separated from each other by a flange 15 and the spool body also is provided with end flanges 16 one of which has a socket 17 in which a handle or crank 18 may be detachably inserted when it is desired to operate the device. The spool body is provided with a central bore 12' to enable the user to place it for rotation on a member forming a part of a spool support 19 which in the present instance is rigidly fastened within the box and permanently associated with the compartment 5.

This spool support, as shown particularly in Fig. 3, comprises a tubular member 20 extending transversely through the compartment 5 and fixed at its ends to a partition wall and an end wall, the corresponding partition and end walls of the box cover 2 being recessed at 21 and 22 to make it possible to close the cover over the tubular member 20.

While the tubular member 20, is, therefore, permanently and rigidly retained in the interior of the box, it is made extensible so as to project from the box near one end thereof and to facilitate the placing of the spool on the projecting end on which said spool then may be rotated by means of the crank 18. A sleeve 23 having a portion approximately coextensive in length with the length of the tube 20 is slidably retained within said tube and is guided for rectilinear movement therein by means of an axial slot 24 in tube 20 into which a lug 25 secured to the extension sleeve 23 may project. This lug 25 and slot 24 hold the sleeve 23 against rotation relatively to the support 19. The slot 24 has enlargements 26 and 27 at its ends, the lug 25 being adapted by a slight rotary movement of the sleeve 23 to enter at the limit of the axial movement of the sleeve 20 these enlargements, whereby the sleeve then is locked against axial movement in either direction. For the purpose of properly supporting this bearing sleeve 23 in its operative position, as shown in Fig. 3, another intermediary sleeve 28 is slidably located within the sleeve 23 and is provided with a shorter or axially extending slot 29 into which a lug 30 extending from the bearing sleeve 23 projects. This intermediary or inner sleeve 28 also is guided in the tubular support 19 by means of an axial slot 31 preferably diametrically opposite the slot 24, and the inner sleeve 28 also is provided with a lug 32 projecting into the same. The sleeves 23 and 28 are retained in proper engagement with each other by friction, and the slots 24 and 31 are provided at their ends with enlargements whereby upon rotation of the outer, extension sleeve 23 for locking the same in either end position, the inner sleeve 28 also may be rotated accordingly and may be locked. The slot 29 in the inner sleeve 28 is shorter than the slot 24 in the outer tube 20 so that upon withdrawal of the sleeve 23 from its retracted position, it may be advanced at first without immediately affecting the inner sleeve 28, until the lug 30 engages the outer end of the slot 29 on the sleeve 28, and in the continued axial movement of the outer sleeve 23, both of the sleeves, therefore, will be advanced to the right, as shown in Fig. 3, until the end of the outer slot 24 is engaged by the lug 25 on said sleeve 23.

The withdrawal or insertion of the sleeve 23 is facilitated by a suitable handle device illustrated in the present instance as a cap nut 33 adapted to ride on a reduced threaded neck portion 34 of the outer sleeve 23, this cap nut having a flange 35 for retaining the device mounted on the bearing sleeve 23 against excessive axial movement in one direction. The rotation of any device mounted on the projected sleeve 23, furthermore, is facilitated by providing means for raising the adjacent end of the box 1. As a means for retaining this end of the box in raised position to permit of a free circular sweep of the crank 18 without touching the ground or other support of the box, a bail shaped member 36 is hingedly secured to the end wall of the box near the bottom edge of the same, and this bail shaped member also may serve for the attachment of a strap 37 or the like by means of which the kit may be supported from the shoulder of the user.

When it is desired to rotate any device mounted on the extended sleeve 23 while the box is supported on a firm ground or other base, the bail shaped member 36 is swung downward into the position shown in Fig. 2, and the crank 18 may then be freely rotated to turn the device on its bearing sleeve 23, axial displacement of this device in one direction being prevented by the engagement of its flange with the end of the box, and axial displacement in the other direction being prevented by the flange 35 of the cap nut 33.

The line drier normally stored in compartment 9, comprises a spool body or drum 40 with a bore of a diameter sufficiently large to enable the same to be placed on the bearing sleeve 23 in a manner described above in respect of the re-reeling device 12. The spool body also is provided with end flanges 41 and a plurality of drier arms 42 are movably connected between said flanges so as to be adapted to be folded to a more compact condition with respect to the body of the drum, as shown in Fig. 1, or so as to be unfolded into operative condition, as shown in Fig. 4.

The arms 42 in the embodiment illustrated in Figs. 4 to 6 consist of sheet metal members having hinge sleeves 43 at their inner ends, the hinge pintles 44 passing through said sleeves and extending into suitable openings in the flanges 41 of the body 40. The drier arms 42 are bent angularly, whereby they may be placed close to the spool body 40 in mutual overlapping relation when folded, as shown in Fig. 1, while when extended, as shown in Fig. 4, they may be retained in operative position through suitable latches. These latches are shown to comprise pintles 45 slidably and rotatably located in short sleeves 46 secured to one surface of the arms between the flanges of the drum, the projecting ends 47 of said pintles being bent to provide short handle portions whereby their turning movement and axial movement can readily be carried out. One of the flanges of the drum has sockets 48 into which the ends of the pintles 45 may be inserted after the arms 42 have been swung to operative position, and in this manner these arms are then locked in this position until the pintles are withdrawn from the sockets 48. The opposite flange 41 of the spool body again may be provided with a socket 17 to facilitate the insertion of the crank 18.

For the purpose of retaining the line in proper condition for drying, the free edges of the arms 42 are provided with projections 49 and indentations 50, whereby the several portions or turns of the line wound on the drier are separated from each other so as to accelerate the drying operation.

While it is feasible to use the drier when supported on the projecting bearing sleeve 23, as indicated in connection with the reeling device 12, Fig. 2, it may be desirable to support either of these devices independently of said bearing sleeve, as for instance when it is desired to unwind the line from the drier 11 to the reeling device 12 after it has been dried.

For this independent rotary mounting of either of these devices a spindle 51 preferably in the form of a tubular sleeve, forms a part of the kit. This spindle, illustrated in Figs. 1, 4 and 5 and 6, is of a sufficiently large outside diameter to form a bearing sleeve for the spool body, and means are associated with said spindle for holding the same manually against rotation while the part mounted thereon may be rotated. A collar 52 fixed to one end of the spindle serves for pivotally receiving the ends of a bail shaped metal member 53, which in inoperative position may be swung over the entire spindle to reduce the length of this supporting device, as shown in Fig. 1.

If it is desired, however, to use the member 53 as a handle, the same may be swung outward, as shown in Fig. 5, and the fixed connection between the spindle 51 and the handle 53 is then assured by means of a latch consisting of a clip 54 fastened to the end of the collar and having hinged thereto a bifurcated tongue 55 adapted to straddle one of the legs of the bail shape member, as shown in Fig. 6, when swung downward.

The enlargement formed by the collar 52 will retain the device mounted on the spindle against excessive or any axial displacement in one direction, and in order to prevent axial displacement in the opposite direction means are provided at the opposite end of the spindle for engagement with the opposite flange of the respective device. For this purpose one or two cam clips 56 are pivotally secured on a pin 57 which is eccentrically mounted in the spindle, these cam clips being retained by means of the head of the pivot 57 in frictional engagement with said spindle end. The clips, furthermore, are provided with angular projecting parts 58 whereby their swinging movement about the eccentrically arranged pin 57 may be facilitated. When in inoperative position permitting the insertion of the spindle into the bore of the drum or reel, the two cam clips may be in engagement with a pin 59 which serves as a stop, making it impossible for the user to swing these clips too far about the pivot pin 57,—a condition which again would have a tendency to bring them into a position in which their outer edges or parts of the same would project beyond the outer circumference of the spindle 51. Similarly other stops 60 in the form of pins also inserted into the end of the spindle serve as means for limiting the movement of the cam clips 56 to operative position in which the outer edges of these clips 56 project beyond the outer circumference of the spindle.

Figs. 7 and 8 show modified drier arms provided with pintle portions 62 for insertion into suitable sockets of the end flanges of a spool body, not shown, whereby they also may be arranged in compact form when it is desired to retain the device in the compartment of the box. These arms are also bent angularly, but are provided with pivoted extensions 63 which in inoperative condition project in the same direction as the outer end of the arms 61 from which position they may be turned to operative position, as shown in full lines in Fig. 7, thereby offering a relatively long edge for supporting the line to be dried. These pivoted extension arms 63 also are equipped with projections 64 and indentations 65 to retain the groups of turns or individual turns of the line suitably spaced from each other, whereby the drying operation will be reduced in time.

The means for retaining the arms 61, as shown in Figs. 7 and 8, in proper position with respect to the spool body also are slightly modified, inasmuch as the inner part of the arms 61 carries pivotally a cam 66 having a finger portion 67 by means of which said cam may be swung about its pivotal support to frictionally engage by means of a suitably shaped edge portion the inner surface of the spool flange and to retain thereby the arms in their extended operative position, as indicated in Fig. 4.

It is, therefore, obvious from the above that either the re-reeling spool 12 or the drier spool 11 may be interchangeably mounted on the bearing sleeve 23 or on the spindle 51 to render both devices operative at the same time, for which purpose of course an additional crank 18 would be included in the equipment of the kit.

A special compartment 68 is provided within the cover 2 of the box, this compartment being partly closed by a wall 69 shaped so as to clear the support 19 when the box is closed. In this compartment 68 more delicate articles of fishing equipment, as for instance artificial flies, etc. may be kept or other parts which might readily get into disorder or disarrange the other articles of equipment if left loose. In order to retain this cover 69 in operative position a spring bar 70 is hinged at 71 entering a notch or recess 72 at the end of this compartment. When it is desired to obtain access to the compartment, the spring bar may be swung aside and a finger may then be inserted into the same through the notch 72.

It is believed that the operation of the various devices, and the novelty and usefulness of the same will be readily apparent from the above specification.

I claim:

1. In a tackle box a plurality of spaced spool bodies, a plurality of compartments each adapted to receive one of said spool bodies, and another compartment with which a spool support is rigidly associated, said spools being selectively mountable on said support.

2. In a tackle box, a compartment containing a tubular spool support, and a plurality of spooling devices selectively mountable for rotation on said tubular spool support.

3. In a tackle box, an extensible spool support permanently associated with the box, and a plurality of spooling devices selectively mountable on the extended portion of the spool support.

4. In a tackle box, an extensible spool support rigidly associated with the box and located when contracted within the box, and a plurality of spool devices selectively mountable on the extension of the spool support when the same has been projected beyond the wall of the box.

5. In a tackle box, a tubular spool support including a telescoping member slidable with respect to said support and adapted to be shifted into the same, and a plurality of spooling devices selectively mountable on the telescoping member upon extending the same from the tubular support.

6. In a tackle box, a tubular spool support permanently associated with the box, a telescoping sleeve slidable within said spool support, means for preventing circumferential displacement of said telescoping sleeve with respect to said spool support, and a plurality of spool devices selectively mountable on said telescoping sleeve when the same has been extended from said support.

7. In a tackle box, a tubular spool support, a telescoping sleeve slidable within said spool support, another sleeve telescoped within said first named sleeve and adapted to support the latter in its fully extended position and a plurality of spool devices selectively mountable on said first named telescoping sleeve for rotating thereon when said sleeve has been extended from said support, the box being divided into compartments in which said spool devices and said spool support respectively are located when not in use.

8. In a tackle box, a tubular spool support permanently associated with the box, a telescoping sleeve slidable within said spool support, a second sleeve within said first named sleeve and movable relatively to the same, means for preventing circumferential displacement of said sleeves relatively to each other and to said spool support, and a plurality of spool devices selectively mountable on said first named telescoping sleeve when the same has been extended from said support.

9. In a tackle box, a tubular spool support, a telescoping sleeve slidable within said spool support, a plurality of spool devices selectively mountable for rotation on said telescoping sleeve when the same has been extended from said support, and means for preventing excessive axial displacement in either direction of any spool device while mounted for rotation on said sleeve.

10. In a tackle box, a tubular spool support, a telescoping sleeve slidable within said spool support, a flanged cap detachably mounted on the end of said sleeve, and a plurality of spool devices selectively mountable on said telescoping sleeve for rotation when the same has been extended from said support, the flange on the cap being adapted to prevent excessive axial displacement of any spool device on said sleeve in one direction.

11. In a tackle box, a tubular spool support, flanged spooling devices selectively mountable for rotation on said tubular support, said tubular support in operative condition projecting from the end of the tackle box, and means on the box for raising that portion from which the end of the tubular support projects with respect to the opposite end of the box.

12. In a tackle box, a tubular spool support adjacent one end of the box and mounted in the interior of the same, means for projecting a portion of said spool support from the end of the box, spool devices selectively mountable for rotation on the extended spool support, a bail shaped member pivotally mounted at the same end of the box and adapted to raise the said end of the box when moved to a predetermined position.

13. In combination with a spooling device for a fishing line, said spooling device having a body with a central bore, a spindle insertable in said bore and adapted to support said body for rotation thereon, and a handle pivotally associated with the spindle and adapted to embrace the spindle when in inoperative position.

14. In a spooling device for a fishing line, the combination of a spool body with a central bore, a spindle insertable in said bore for supporting the body rotatably thereon, a handle pivotally associated with said spindle and adapted in inoperative position to embrace the spindle, and in operative position to form an extension, and means on the spindle for locking said handle in operative position.

15. In a spooling device for a fishing line, the combination of a spool body with a central bore, a spindle insertable in said bore for supporting said body rotatably thereon, a bail shaped member hingedly connected with the spindle and adapted to surround the same when placed in inoperative position, and a latch at one end of the spindle, said latch having a bifurcated element for engaging a leg of said bail shaped member, and adapted to lock the bail shaped member in extended position.

16. In a spooling device for a fishing line, a spool shaped body with a central bore, a spindle insertable in said bore for rotatably supporting said body, a handle on said spindle, means for locking said handle in operative position on said spindle, and means on said spindle for preventing axial displacement of the spool body thereon.

17. In a spooling device for a fishing line, a spool body with a central bore, a spindle insertable into said bore for rotatably supporting said body, the spindle having an enlargement near one end adapted to prevent axial displacement of said spool body on the spindle in one direction, and releasable means at the other end of the spindle for preventing axial displacement of said spool body in the opposite direction.

18. In a spooling device for a fishing line, a spool body with a central bore, a spindle insertable into said bore and adapted to support the body for rotation thereon, an enlargement at one end of the spindle, a clip pivotally mounted on the opposite end of the spindle at a point eccentric to the axis of the same and adapted when swung in one position to project beyond the circumference of the spindle, said enlargement and clip being adapted to prevent axial displacement of the spool body on the spindle, a handle pivotally mounted on the enlargement, and a latch for securing said handle in operative position.

In witness whereof I have hereunto affixed my signature this 15th day of October, 1925.

EDWARD C. MEAD.